United States Patent [19]

Pugh et al.

[11] Patent Number: 5,414,754
[45] Date of Patent: * May 9, 1995

[54] SYSTEM FOR PROVIDING PROACTIVE CALL SERVICES UTILIZING REMOTE MONITORS

[75] Inventors: Joel A. Pugh, Dallas; Robert E. Nimon, Arlington, both of Tex.

[73] Assignee: Messager Partners, Dallas, Tex.

[*] Notice: The portion of the term of this patent subsequent to Jul. 14, 2009 has been disclaimed.

[21] Appl. No.: 911,020

[22] Filed: Jul. 9, 1992

Related U.S. Application Data

[63] Continuation-in-part of Ser. No. 524,633, May 16, 1990, Pat. No. 5,131,024.

[51] Int. Cl.⁶ .............................................. H04M 1/64
[52] U.S. Cl. ..................................... 379/67; 379/88; 379/201; 379/204; 379/211
[58] Field of Search ................ 379/212, 213, 214, 218

[56] References Cited

U.S. PATENT DOCUMENTS

| | | |
|---|---|---|
| 4,160,129 | 7/1979 | Peyser et al. |
| 4,529,841 | 7/1985 | Andersson et al. ............ 379/218 X |
| 4,594,477 | 6/1986 | Noirot ................... 379/232 |
| 4,661,974 | 4/1987 | Bales et al. .......................... 379/198 |
| 4,777,647 | 10/1988 | Smith et al. ......................... 379/151 |
| 4,825,460 | 4/1989 | Carter et al. ......................... 379/67 |
| 4,873,718 | 10/1989 | Barnett et al. ...................... 379/156 |
| 4,908,850 | 3/1990 | Masson et al. .................... 379/91 X |
| 4,908,852 | 3/1990 | Hird et al. ........................ 379/130 |
| 4,924,497 | 5/1990 | Smith et al. ....................... 379/150 |
| 4,933,965 | 6/1990 | Hird et al. .......................... 379/112 |
| 4,933,966 | 6/1990 | Hird et al. .......................... 379/132 |
| 5,023,868 | 6/1991 | Davidson et al. ................ 379/93 X |
| 5,157,718 | 10/1992 | Kaplan et al. ....................... 379/218 |
| 5,164,981 | 11/1992 | Mitchell et al. ..................... 379/218 |
| 5,278,895 | 1/1994 | Carlson .......................... 379/145 X |

Primary Examiner—James L. Dwyer
Assistant Examiner—Daniel S. Hunter
Attorney, Agent, or Firm—David L. McCombs

[57] ABSTRACT

A proactive call services system serving as a new node or switching network within a closed subsystem is disclosed. Remote monitors provide information necessary to allow the provision of enhanced services to the closed subsystem, which may be a telephone operator position system (TOPS) switch of a public switched network (PSN). The proactive call services system includes a network interface, voice interface, call processing platform (CPP), link platform and monitors integrated with the PSN. The system gathers information as the TOPS switch processes a call, and with this information offers additional proactive call services to the caller.

20 Claims, 3 Drawing Sheets

SYSTEM FOR PROVIDING PROACTIVE CALL SERVICES UTILIZING REMOTE MONITORS

CROSS REFERENCE TO RELATED APPLICATION

This application is a continuation-in-part of application Ser. No. 07/524,633, filed May 16, 1990, for Method and Apparatus for Providing Proactive Call Services Following Call Completion, now U.S. Pat. No. 5,131,024.

TECHNICAL FIELD

The present invention relates to telephone systems and more particularly to a system utilizing remote monitors for providing a variety of user-controlled proactive services.

BACKGROUND OF THE INVENTION

It is known in the prior art to carry telephone calls between local telephone operating companies through the AT&T network or through one or more independent inter-exchange carriers such as MCI or Sprint. The local telephone operating companies operate within a so-called local access and transport area (LATA). When a long distance call is dialed, the call is usually transmitted through an operating company central office to a point of termination in the originating LATA at which it is picked up by the inter-exchange carrier and passed by that carrier on to a termination point in a distant LATA. Upon reaching the destination LATA, the call is then transferred by the inter-exchange carrier to the local operating company central office within that LATA for ultimate connection to the original called station therein. Typically, the termination points of each LATA include suitable switching circuits, e.g., an access tandem, that are interconnected by a digital serial link. Such digital links are also presently used to interconnect virtually all central offices as well as to interconnect operating company switching networks to one or more cell site control switches of a mobile telephone network.

It is also known in the prior art to provide "automatic voice messaging" where, upon the occurrence of a busy/ring-no-answer condition at a called station, the user of the calling station can be connected to a voice message facility for recording a voice message for subsequent delivery to the called station. The decision to accept or reject the automatic voice messaging service is determined by the caller. Automatic voice messaging operates essentially after a call has been initiated but before the call can be completed to the called station.

It would be desirable to extend the advantages of caller-controlled automatic voice messaging to facilitate the providing of enhanced proactive services after call completion.

Numerous subsystems exist in the network. Although not meant to be limiting, examples of these subsystems include cellular networks, traffic operator position systems (TOPS) and other switches associated with a public-switched network (PSN). For example, a cellular network subsystem processes calls and transfers them into the local exchange carrier's PSN. A TOPS handles calls beginning with "0" utilizing automated processes (such as calling card billing systems) and forwards the calls into the main "1+" long distance network.

Most subsystems have their own billing and metering systems (such as cellular). A problem associated with the provision of proactive call services is the "closed nature" of the subsystems comprising the existing telephone network. The subsystems are architecturally "closed," in that they are designed to prevent equipment outside the original architecture of the subsystem to interfere with a call in process inside the subsystem. Closed subsystems, such as an operator system with a base unit and supporting remote systems, work together to process a call, after which the call is passed through to the network so that it may terminate at the destination. A typical closed subsystem has computer interfaces for computer support (such as data bases for calling card verification) and stations for live operator support, but these interfaces do not generally allow for switching equipment to redirect the call from within the closed system or allow for additions, subtractions or modifications to the call in process, or otherwise allow for any other service which might be utilized to effect or redirect the call in process.

The closed subsystem is controlled by a master switching arrangement that sends calls to several sub-support slave facilities (live operators and voice processing systems, each supported by computer databases). The master switching arrangement creates billing records and is designed to be the only mechanism for processing (either manually or automatically) the call to pass via the "1+" system to its destination.

What is needed is a programmable interface to easily manipulate existing closed subsystems for the provision of proactive call services.

BRIEF SUMMARY OF THE INVENTION

It is an object of the invention to provide caller-controlled proactive telephone services to a caller after call completion.

It is another object to provide a unique system architecture that facilitates the offer/acceptance of various ancillary user services to the original caller at the calling station and/or the original called party at the called station after call completion between the calling station and called station.

It is a further object of the invention to provide an apparatus that silently monitors a line between calling and called stations following call completion, detects a request for an ancillary user service, and then controls the providing of such service at the request of either the calling party or the called party.

It is yet another object of the present invention to provide an apparatus having on-line monitoring capabilities for the selective offering and providing of various ancillary services under the control of, and at the cost of, one of the parties to the completed call.

It is yet another object of the invention to provide these services for a traffic operator position system (TOPS) of the public switched network (PSN).

These and other objects of the invention are achieved in a preferred embodiment of the invention providing an apparatus for use in a telephone network having a calling station connectable to a first switch and a called station connectable to a second switch, with the first and second switches being connectable by a link. Generally, the apparatus comprises an interface having a passive in-line monitor connected in the link for detecting entry of a predetermined service access code by a user of the calling station or a user of the called station after call completion between the calling station and the called station and before either of the users goes on-hook. Upon entry of the predetermined service access code, a speech circuit of the apparatus issues a predetermined prompt to the user of the calling station and/or the user of the called station. Processor control circuitry of the apparatus is then responsive to entry of predetermined signaling by one of the users following the issuance of the prompt for providing a predetermined service controlled and paid for by the user requesting the predetermined service. Alternatively, if the user(s) are aware of the service offering, the speech circuit is not required in order to offer the service. In such alternative embodiments, the speech circuit can be used for a confirmation prompt.

In another embodiment of the invention, a proactive call services system serving as a new node or switching network within a closed subsystem, is assisted by remote monitors to provide information necessary to allow the provision of enhanced services to the closed subsystem. An exemplary closed subsystem is a TOPS of a public switched network (PSN). These proactive call services include, for example, automatic call back (ACB) and automatic message delivery (AMD). The system includes a proactive call services network interface, a voice interface, a call processing platform (CPP) and remote monitors. The network interface serves as a switching device which can be located in the existing closed subsystem so as to add new proactive call services without requiring modifications to the existing subsystem. The network interface is controlled by the call processing platform (CPP) which is a support computer for gathering information from remote monitors.

The monitors of the system in one embodiment include an active monitor which changes the information provided by the original support computer of the subsystem, in a manner directed by the CPP attached to the network interface, so as to cause the original subsystem to handle the call in a different way, while the original subsystem processes the modified support information.

The original call information coming into the subsystem can be manipulated (adding, subtracting, or changing information in the fields of signals that set up the call for transfer) by the proactive call services system to cause the original subsystem to process the call differently, or add processes to calls within the subsystem or at the end of the subsystem.

In such a digital subsystem, the proactive call services system can alter the call information by accepting the original call information from a first switch at the network interface and sending all or a portion of the information to the call processing platform (CPP). The network interface transfers the information to a second switch after selectively altering the information to modify or enable modification of the service offerings. The CPP controls the network interface to modify the service offering based on information transferred from the monitors connected to the support computers of the TOPS subsystem. The monitors gather call-related information and transfer the information to the CPP which can then modify the call set-up information at the network interface.

BRIEF DESCRIPTION OF THE DRAWINGS

For a more completed understanding of the present invention and the advantages thereof, reference is now made to the following detailed description taken in conjunction with the accompanying drawings in which.

DESCRIPTION OF THE PREFERRED EMBODIMENTS

Figures 1A, 2:
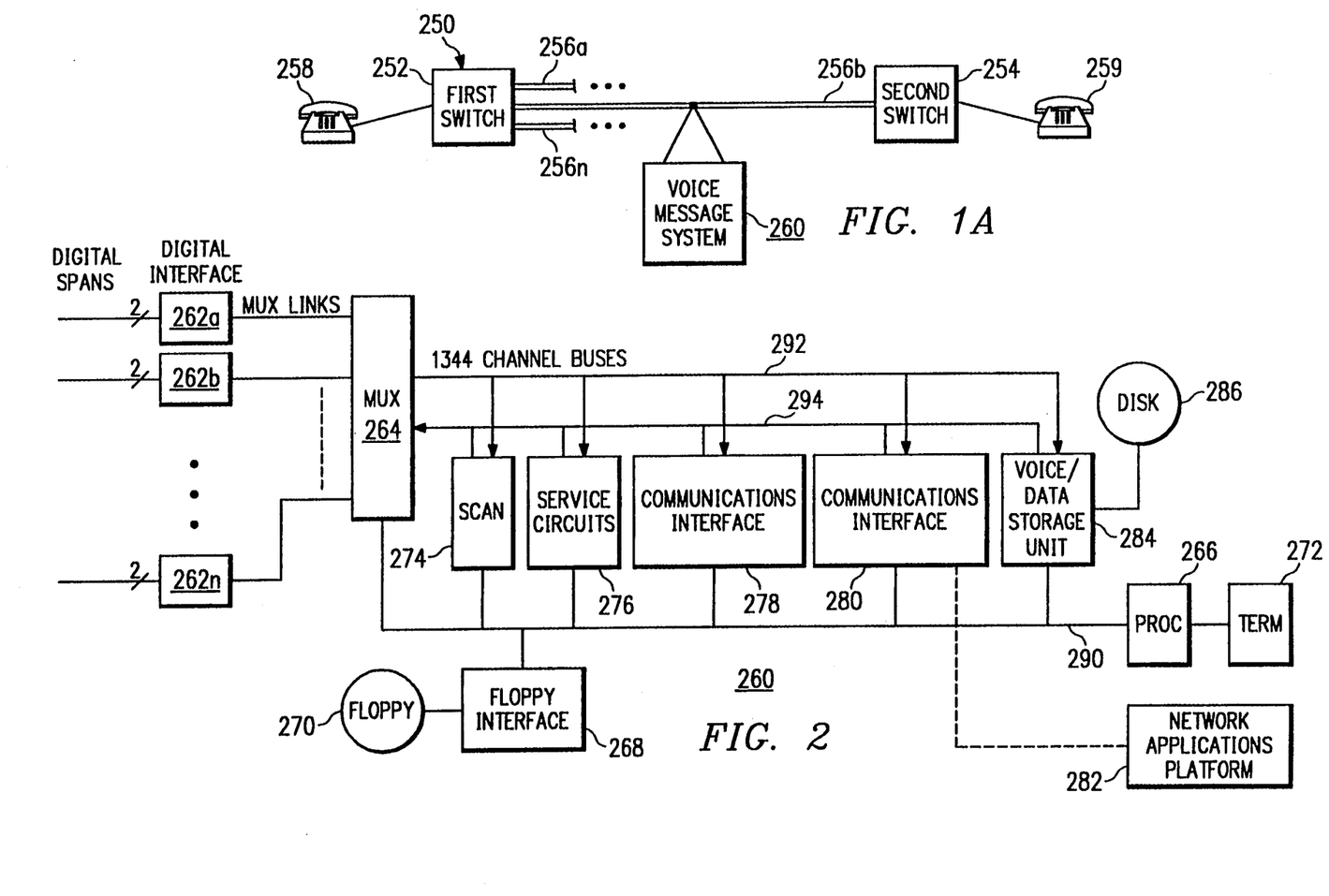
FIGS. 1A, 1B and 1C are block diagrams of a digital telephone network in which a proactive call services system is preferably incorporated.
FIG. 2 is a detailed block diagram of the preferred embodiment of the proactive call services system of FIG. 1.

Referring now to FIG. 1A, a block diagram is shown of a generic digital telephone network 250 in which an automatic voice message system is advantageously provided according to the teachings of application Ser. No. 07/478,674, now U.S. Pat. No. 5,036,533. The telephone network generally includes a first switch 252, a second switch 254, and a plurality of digital communications links interconnecting the first and second switches 252 and 254 and designated by the reference numeral 256a–n. At least one digital link 256 is preferable a high speed (1.544 MHz) T-1 span over which conventional in-band signaling is provided in a serial fashion; of course, other higher speed links as DS/3 can be used. Link 256, alternatively, is a high speed digital serial link over which digital signals are provided using out-of-band signaling with other communications protocols, such as X.25 or common channel signaling (SS7). The foregoing and other signals such as automatic number identification (ANI), destination number identification (DNI), billing information and Feature Group D information as generally referred to as call set up signals.

For purposes of generalization, FIG. 1A shows a calling station 258 connected (or connectable to via a central office or the like) to the first switch 252 and a called station 259 connected (or connectable) to the second switch 254. For the remainder of the discussion, it is assumed that a call to the called station 259 is initiated by a caller at the calling station 258. A proactive call services system 260 is placed across or in a digital link 256 for enabling the offering and acceptance of one or more predetermined call services under the control and at the expense of the caller at the calling station 258 or the caller at the called station.

Without limiting the foregoing, the first and second switches 252 and 254 are access tandems located at termination points between two LATAs. Alternatively, the first switch 252 is an access tandem and the second switch 254 is a cellular tandem or cell site controller for a mobile telephone system. In the configuration, the network 250 may be an operating company central office while the second switch 254 is an access tandem. The first and second switches can interconnect two central offices. The system 260 is bridged across the link.

Figure 1B:
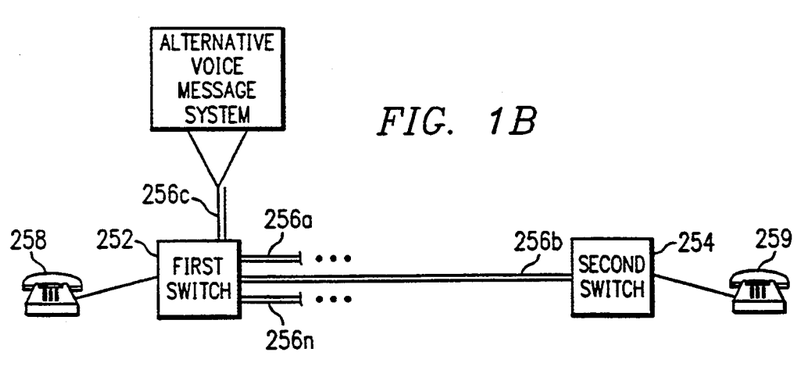
Figure 1C:
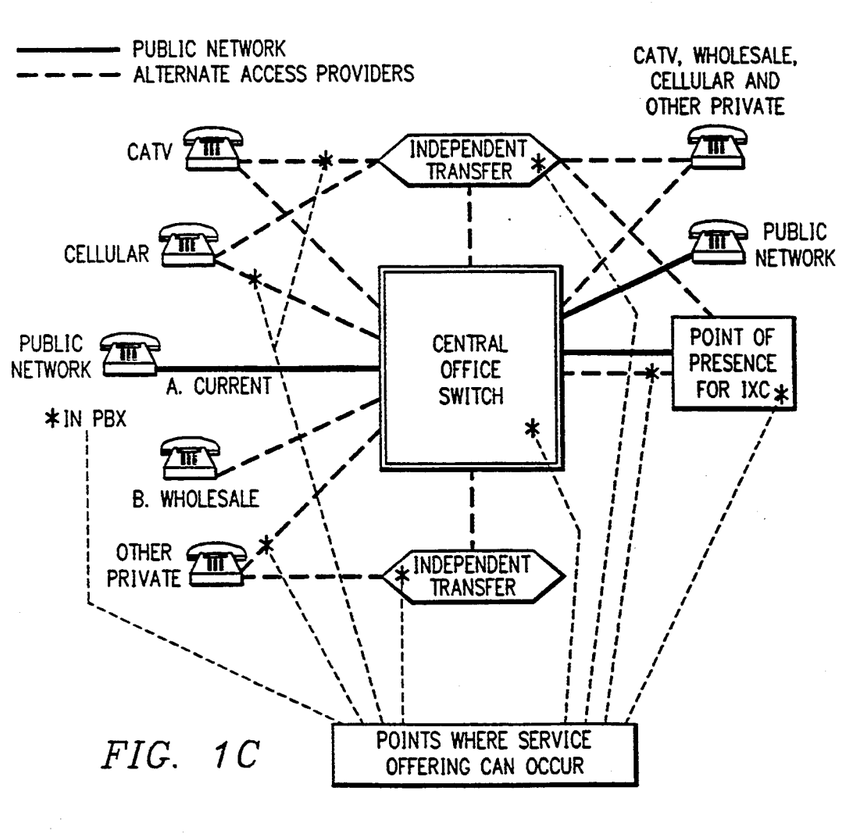

Referring briefly to FIG. 1B, in an alternate embodiment the system 260 is placed in a self-contained loop 256C from the first switch 252 (or the second switch 254 (not shown)). A "self-contained" loop means that the system 260 is located internally to the switch or as an adjunct thereto.

Referring now to FIG. 2, a detailed block diagram is shown of the preferred embodiment of a proactive call services 260 for use in a digital network environment. System 260 preferable includes an interface means including a plurality of interface circuits 262a–n each connected to a multiplexer 264. The multiplexer includes a control bus connected to a control means comprising a processor 266, storage interface 268, storage device 270 and input/output device 272. The processor is controlled in a conventional manner by suitable application programs stored in the storage device 270. Input/output device 272 is used to modify the system operation by entering suitable program commands to the control means.

The system 260 further includes a number of circuits for facilitating various monitor intercept, prompting, conferencing and redirect functions as will be described in more detail below. A scanner circuit 274 is provided to identify Feature Group D supervision or other similar information depending on the type of signaling used. A service circuit 276 includes a passive line monitor circuit as well as all necessary call progress (e.g., busy/ring-no-answer) detection circuits, speech generation circuits, and service acceptance (e.g., DTMF) detection circuits. The service circuit 276 also preferable includes appropriate circuitry for capturing ANI, DNI and billing information. A first communication interface 278 is provided to receive, interpret, format and transmit 557 messages as will be described in more detail below. The system preferable also includes a second communication interface 280 connected to a network applications platform 282. The platform 282 includes a billing computer and other appropriate devices such as a dedicated voice storage unit 284 for storing voice messages or call conversations as will be described. A disk storage 286 is connected to the voice storage unit 284. The voice message storage may take place either in the voice storage unit or in the network applications platform, as is appropriate, to facilitate subsequent delivery.

Each of the circuits 274, 276, 278, 280, and 284 are connected to the processor 266 via the control bus 290. Input/output channel buses 292 and 294 also interconnect these circuits to the multiplexer of the interface means. Preferably, the interface means includes twenty-eight (28) T-1 interface circuits, each of which is connected to two digital links. Each T-1 interface circuit includes first and second T-1 interfaces are interconnected by means of the switch 298. Given this architecture, i.e., with 28 T-1 spans each carrying twenty-four (24) channels, the buses 292 and 294 service 1344 channels.

To provide automatic voice messaging, the scanner 274, service circuit 276 and/or communications interface 278 monitor the received signaling to determining the state of the call progress. Of course, the actual circuit used depends on the type of signaling. If an 557 protocol is used, communications interface 278 monitors the line. If Feature Group D signaling is used, the Feature Group D information is collected in and processed by service circuits 276; other types of signaling are collected and processed by scanner 274. When call processing is required due to a busy or ring/no answer condition, the processor 266 activates the service circuits 276 to thereby issue a prompt offering (e.g., "Your party is not available; if you would like to leave a message, please press the key") and monitor the line for acceptance of the service. Processor 266 also controls the circuit 276 to capture ANI, DNI and billing information. If the services is accepted, the service circuit 276 notifies the processor 266, which then controls the service circuit to issue appropriate prompts to the caller to instruct the caller to begin recording the message. The message is then recorded by the voice storage unit 284, and the processor controls the service circuit 276 to transfer the ANI, DNI, and billing information to the network applications platform 282. Although not meant to be limiting, preferably voice messages are stored in the voice storage unit 284 or its associated disk storage, while ANI, billing and other management information resides in the network applications platform.

For message delivery, the network applications platform ships the message routing information (i.e., the ANI, etc.) back to the voice storage unit 284, and the processor 266 then locates an open channel on a link for outdialing to the original called station. The service circuit then dials the call. When the call is placed, the scanner 274 watches the call states for on-hook/off-hook detection. If off-hook is detected, the service circuit 276 issues a prompt announcing the message which is then delivered by the voice storage unit 284. When the message is delivered, the processor 266 notifies the network applications platform and the packet is deleted.

If desired, the system 260 is connectable to a remote host computer via a dedicated communications interface which in turn is connected to the remote host vial an RS-232 link or the like. This enables messages to be transferred to another location for the subsequent outdial attempts. As an alternate embodiment, the network applications platform 282 is set up to control billing and delivery attempts while the remote host issues the prompt announcing the message and other voice functions. The remote host can alternatively retain all billing information with the voice messager or other call information with the voice messager or other call information for short time; and then passes off all such information to the platform 282 for further processing. It is also possible to have the voice storage unit 284 pass a "packet" (comprising the billing information) downstream to a platform 282 in a destination delivery area (i.e., a destination LATA).

The architecture of FIG. 2 is quite useful in providing various ancillary "instant" services to the calling station user and/or the called station user after the call between these parties has been completed. As used herein, "call completion" means the calling station has been successfully connected to the called station, i.e., a busy/ring-no-answer has not been encountered by the calling station user upon call initiation to the called station. According to the present invention, one or more such ancillary services are provided after call completion but before either party goes back to an on-hook condition.

One such ancillary service is conference calling. During the call, if either party determines that a conference is needed, that party can enter a predetermined access code (e.g., "2,2") which is detected by the passive on-line monitor circuit in the service circuit 276 of the system. Detection of the predetermined access code causes the processor 266 to control the service circuit to issue a prompt, e.g., "if you would like to add another party to this call, please dial that party's number now" or "if you would like to add a party to this call, please press and follow the instructions" or the like. Depending on the prompt offering, one of the parties then enters the necessary signaling (dialed digits or the sign, etc.) to accept the service offering. This signaling is detected by the service circuit 276 at which point the processor seized an available line and places the call to the party sought to be conferenced. Such call initiation continues while the originally completed call remains in progress between the calling station and the called station. The system can either mute the ringing signals to the third party or allow such signals to be heard by the parties. Upon call completion to the third party, the processor 266 bridges the calls together to provide the conference. The database in the network applications platform 282 could then provide billing validity information as well as storing the billing information. Generally, the party who accepts the service is billed.

The system of FIG. 2 thus facilitates call conferencing in a proactive or caller-controlled manner which has heretofore never been available. From the caller's perspectives such ancillary services are provided to the call-in-process unobtrusively. If the parties are familiar with the service Offering, a prompt Offering may not be necessary following entry of the predetermined access code. In this embodiment, detection of the predetermined access code by the monitor circuit of a "beep" tone or superimposed dialtone (over the existing talkpath) instead of the prompt offering. One of the parties then dials the third party's telephone number or enters the appropriate code for acceptance of the service as the case may be. confirmation of follow-up prompts may then be provided if necessary.

Yet another ancillary service available through the system of FIG. 2 is call recording. During the call, one or both of the parties may decide to record the call. Upon detection of a predetermined access code (e.g., a 2.7) by the on-line monitor of the service circuit 276, the circuit signals the processor 266. Processor 266 in turn connects the voice storage unit on line to immediately begin recording the call. Alternatively, the parties are provided the prompt offering to determine whether the continued conversations are to be recorded. The recording of the call, and the associated information packet containing the requesting party and billing information, is then transferred to the network applications platform 282 after the pathway to the platform is established as previously described. The party requesting the recording can then recall the recorded conversation from the platform 282 using dialup parameters such an entry and verification of security codes. Other collateral services, such as transcription of the recorded call, can thus be arranged and billed to the requesting party.

Another ancillary service is silent call recording. In this embodiment, a predetermined service access code is detected by the passive on-line monitor but not sent down the line to the party at the called station. The recording of the call is then carried out privately without the other party's knowledge. With this service, there is no need to provide a prompt Offering, however, a one-way confirmation (to either the calling party or the called party) is provided if desired.

Although not shown in detail, it should be appreciated that the architecture of FIG. 2 is quite powerful and enables the service provider to provide numerous ancillary call services that have heretofore been unavailable to users except in only limited ways behind a private branch exchange or the like and without the capability of providing such services in a proactive, caller-controlled and billed manner as described herein.

Figure 3:
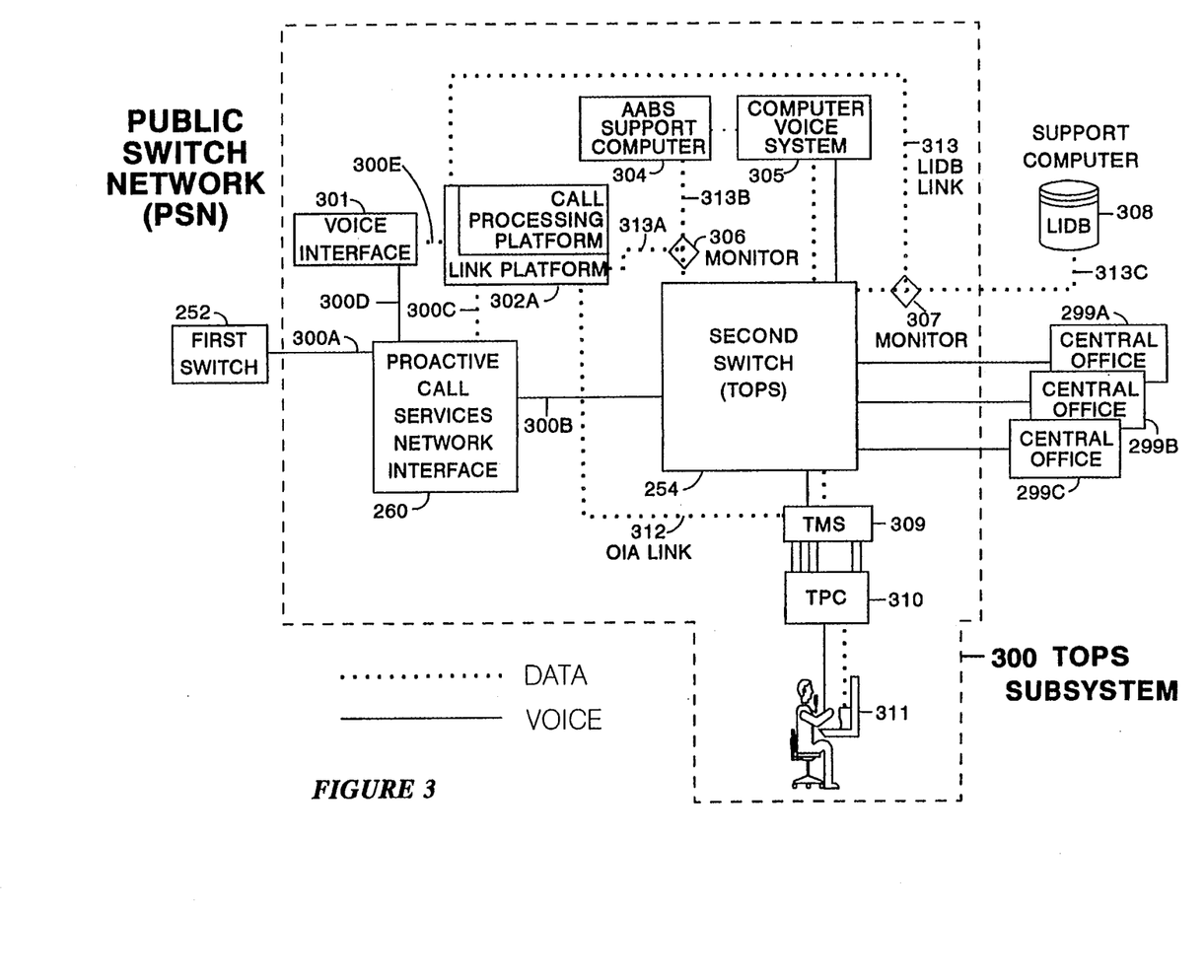
FIG. 3 is a block diagram of a proactive call services system supported by remote monitors integrated into a network subsystem.

In FIG. 3 there is shown an alternative embodiment of the present invention comprising a proactive call services system utilized in a public switched network (PSN) and a traffic operator position system (TOPS) subsystem 300 incorporating the second switch 254. The switch 254 is a commercially-available model known as a Northern Telecom DMS-200. In the present embodiment, the switch 254 automatically distributes calls to live operator stations 311 via a TOPS message switch (TMS) 309 and a TOPS position controller (TPC) 310, or to an automated alternative billing system (AABS) operator support computer 304, assisted by a computer voice system 305. Since the TMS 309, the TPC 310, the AABS support computer 304 and the system 305 are well known components, they are not described further. As will be described in detail, the proactive call services system of the present invention gathers information as the TOPS switch 254 processes a call, and with this information offers additional proactive call services to the caller.

The public switched network (PSN) includes a switching transfer point indicated by the first switch 252. The switch 252 may be operationally coupled to a terminating switch or subsystem or to an originating switch or subsystem. Two or more switching transfer points are coupled to the TOPS switch 254 as shown by central offices 299a, 299b, 299c.

The proactive call services system of the present invention includes a proactive call services network interface 260, a voice interface 301, a call processing platform (CPP) 302, a link platform 302a, and monitors 306, 307. The system is operationally coupled with the switch 254 and TOPS subsystem 300. The network interface 260 is connected between the first switch 252 and the TOPS switch 254. Trunks 300a from the switch 252 are connected to the input side of the interface 260 and trunks 300b from the interface 260 are connected to the TOPS switch 254. The interface 260 monitors the trunks 300a for supervision changes, MF digit strings and call progress tones (ringing, busy, voice energy, etc.). All trunk activity is reported to the CPP 302. Additional outbound trunks 300b from the interface 260 are used to originate message delivery calls. The CPP 302 controls call processing in the interface 260 via an SDLC data link 300c. One CPP 302 can control multiple interfaces 260. The CPP 302 is coupled to the link platform 302a. The link platform is coupled to the monitor 306 via a data link 313a, and to the monitor 307 via a data link 313.

The voice interface 301 consists of an 80486 processor-based industrial chassis with two Dialogic boards and ETHERNET interface (not shown). The voice interface 301 provides voice prompting, voice recording and voice message playback under the control of the CPP 302. The voice interface 301 is connected to the interface 260 via T1 trunks 300d and is connected to the CPP 302 via an ETHERNET LAN 300e.

The monitors 306, 307 are devices which relay the information transmitted on the respective data links 313b and 313c to the link platform 302a.

The CPP 302 monitors the SS7 data links 313 connected to a support computer line interface database (LIDB) 308, gathers information, communicates with the operator station 311 via an OIA link 312 and controls all system maintenance and administration. The CPP 302 communicates with the interface 260 via the trunks 300c and ETHERNET LAN 300e.

The CPP 302 is a Sun SPARC II workstation with 64 Mbyte memory, 600 Mbyte disk, ETHERNET interface, and eight SDLC ports. One CPP 302 can control up to four redundant interfaces 260 through the eight SDLC ports. Platforms 302 are themselves redundant and run in both active and standby modes. In the event of failure of the active CPP 302, the standby will take over control of the interface 260. Calls established will not be affected by a CPP 302 switchover, although calls in process (calls originated, but not completed) will be lost. The CPPs 302 communicate to the other elements of the system via an ETHERNET LAN.

The link platform 302a is a Sun SPARC II Workstation with 64 Mbyte memory, 600 Mpyte disk, ETHERNET interface, EBS 557 interface card, V.35 serial interface, 9-track tape and CD reader. The link platform 302a resides with the CPP 302. The link platform 302a monitors a TOPS SS7 link 313c connected to the LIDB 308, via the link 313. The platform 302a functions as the database server for data exchange to the operator 311, and provides the man/machine interface for maintenance and administration. The link platforms 302a are redundant and run in an active/standby mode. In the event of failure of the active link platform 302a, the standby link platform 302a will take control of all link platform 302a functions, and calls established will not be affected by a link platform 302a switchover, although calls in process (calls originated, but not completed) will be lost. The link platforms 302a communicate with the platforms 302 over the ETHERNET LAN.

An SS7 interface board (not shown) manufactured by EBS resides in the link platform 302a. Each board can monitor up to two links 313. There is one interface board in each of the redundant link platforms 302a. This board passively monitors traffic on the SS7 datalink 313 to the LIDB 308. The board filters out all but the transaction capabilities application part (TCAP) portion of the SS7 link 313c transactions. These TCAP messages are then passed to the applications level code in the link platform 302a for processing.

The interface 260 in the present embodiment is manufactured by Summa Four, Inc., as Model No. SDS-1000. The interface 260 is an open architecture, digital switching and processing platform suited to a wide range of telecommunications enhanced service applications. The interface 260 provides nonblocking digital switching and support for all analog and digital trunk interfaces and service circuit requirements. Each interface 260 incorporates 1776 port PCM digital switching, stored program control and signal processing including speech recognition. Systems requiring more port capacity use multiple interfaces 260 clustered together. Trunks 300a carrying O+, 0—, and 1+ coin traffic are terminated at the interface 260. For each trunk 300a terminated at the interface 260 there is a corresponding outbound trunk 300b from the interface 260 terminated at the TOPS switch 254. Call seizures of the switch 252 detected by the interface 260 are reported to the CPP 302 and the corresponding TOPS switch trunk 300b is seized. The interface 260 has a compliment of service circuits 276 (FIG. 2) to receive and generate MF tones, detect call progress such as busy, ring-back, and voice energy, and to provide for digital conferencing.

Call Progress Analyzers (CPA) (scanner circuits 274, FIG. 2) included in the network interface 260 are bridged onto calls in process to determine if enhanced services should be offered to the caller. The interface 260 communicates to the CPP 302 via the SD-RS-232C data link 300c running at up to 38.4 kb. The interface 260 contains redundant processors (not shown) each of which have dedicated links (also not shown) to redundant CPPs 302.

The interface 260 in the present embodiment functions as a "new" switching node or network interface such as shown in FIG. 3 connected between the switches 252 and 254. The interface 260 is functionally integrated, as will be described, with system support computers 304 of the TOPS subsystem 300 by one or more of the monitors 306 attached to the support computer 304. A call in process can be manipulated by the interface 260 to add enhanced services from within the previously closed PSN 300.

One technique for manipulating a call is for passive monitors 306 and 307 to feed information to the CPP 302 attached to the system 260. The interface 260 modifies the set-up or header information (such as the ANI, call type, destination number, etc.) of a call and is directed by the CPP 302, based on information provided from the monitor 306, 307 or deciphered by monitoring call process information collected by the system, to cause the TOPS subsystem 300 to handle the call in a different way, providing other proactive call services.

The functions of the network interface 260 are implemented by software instructions stored in a conventional manner within the interface. The instructions may be designed and implemented using known object oriented design (OOD) methodologies and smalltalk language.

The CPP 302 via the interface 260, monitors the 0+, and 1+ coin trunks 300a from the switch 252 to the TOPS switch 254 to determine if enhanced services are to be offered to callers. These services are offered automatically by voice prompt when a caller encounters a busy or ring/no answer condition.

The interface 260 reports trunk seizures, digits received, and other call data to the CPP 302. The CPP 302 also sends commands to the interface 260 such as seize, dial digits, wink, etc. The CPP 302 will not interfere with the normal flow of calls and should not add any appreciable delays to the call setup.

In operation, the proactive call services system of the present invention provides procactive call services to a caller for a call processed by a closed-architecture TOPS subsystem 300. Upon initiation of a call, the switch 252 seizes the trunk 300a. Upon report of a switch 252 trunk seizure, the interface 260, under the control of the CPP 302 takes the necessary actions to seize the corresponding TOPS trunk 300b, bridge an MF receiver onto the call to collect the calling number (ANI), called number, and call type as it is sent from the switch 252 to the switch 254. Both the switch 254 and an MF receiver in the interface 260 detect the MF digits at the same time. The caller perceives no difference in the handling of the call.

The caller's billing number, prompted for by the TOPS switch 254 and entered by the caller via the phone's touch pad, is verified by the TOPS switch through the LIDB 308. Once verified, the TOPS forwards the call to the destination number. This billing information is available to the CPP 302 via the monitor 307 connected to the link platform 302a. When the CPP 302 receives billing verification, the call progress analyzer (CPA) of the interface 260 is bridged onto the call. The CPA detects busy, ring back, voice energy, wink, seizure, release and ring-back cessation.

Proactive call services are offered to the caller upon detection of a busy/ring-no answer condition by the interface 260. Upon detection of a busy/ring-no answer condition, the voice interface 301 is bridged onto the caller's trunk 300a. The voice interface 301 prompts the caller for a proactive call service such as automatic call back (ACB) or automatic message delivery (AMD). It is understood that other proactive call services may also be offered. If ACB is selected, the interface 301 prompts for ACB parameters and passes this information back to the CPP 302. Proactive call services can be provided by the proactive call service system or alternatively can be directed to a third party provider. The CPP 302 then routes the call to the selected service provider which then records the caller's message and attempts to place the call at a later time.

If the caller does not understand the prompts issued by the interface 301 or wishes to be connected to a live operator, all previously collected call data can be transferred to the operator station 311 via the OIA link 312 to the OIA Database Server (ODS) subsystem. Once the operator has determined what, if any, enhanced services the caller desires, that information is transferred back to the CPP 302 via the same link 312 and the operator is released.

The ACB service provider uses data gathered by the CPP 302 to initiate calls to a destination number on a timed basis; e.g. every fifteen minutes for the next four hours. If the destination number answers, the ACB feature plays a recorded message informing the called party that this is an automated call and to hold while the calling party is connected. The ACB service then calls the originating number. Upon answer, the original caller is connected to the destination party.

If at the end of the time period all call attempts to the destination number go unanswered, the originator is called back and prompted for an extension of the time period for an additional charge.

Operator stations 311 on the TOPS switch 254 can connect to external databases via an X.25 datalink at the TMS 309. An OIA database server (ODS) is an implementation of one of these databases. Detailed descriptions of the OIA layers of the protocol can be found in the Northern Telecom Inc. document: "OIA Interface Specification" dated Sep. 10, 1991, incorporated herein by reference. The ODS is the mechanism used by the CPP 302 to transfer call data to and from the operator stations 311.

Callers can elect to be transferred to a live operator at any time during prompting for enhanced services by pressing "0". The voice interface 301 reports the transfer request to the CPP 302. The CPP 302 initiates an "0—" call to the TOPS switch 254 using a unique call type. This unique call type causes an automatic start of a database session with the ODS. Call information (including ANI) is sent to the ODS over the X.25 datalink. ODS queries the CPP 302 using ANI to identify the originating trunk 300a. The CPP 302 transfers all previously collected call data such as message delivery provider, destination, billing information, etc to the ODS. The ODS forwards this data to the operator station 311 along with a list of enhanced services options from which the caller can choose. This data and options are displayed on the operator screen and are verbally offered to the caller. The operator enters the caller's enhanced service choices. These choices are then sent to the ODS which in turn passes them to the CPP 302.

The TOPS switch 254 verifies all billing numbers with the LIDB 308. The TOPS switch 254 is connected to the LIDB 308 by a pair of SS7 datalinks 300e. The SS7 monitor 306 monitors all transactions including LIDB 308 queries, and LIDB responses. The LIDB monitor 307 forwards the billing verification or denial to the CPP 302.

Callers accepting enhanced services will be charged a predetermined fee in addition to regular line charges. The verified billing number received from the LIDB monitor 307 will be used as the billing number for the enhanced service. A billing record will be created and transferred to 9-track tape. The format of these billing records can be specified by a local exchange carrier.

The following examples of proactive call service applications illustrate operation of the interface 260 in the present embodiment. The applications discussed are automatic message delivery and automated callback. A call is processed upon successful completion of billing validation either by the support computer 304 or by manual procedures. If a busy or ring/no answer condition is detected by the interface 260, a series of menus is offered to the caller using the voice interface 301. The first voice menu prompts the caller for automatic callback (if dialing from a nonpublic telephone), automatic message delivery or transfer to a live operator. If at any time during the initial prompt, the called party answers the call, the prompting is immediately discontinued and the call is completed to the destination.

If the caller selects automatic callback, the caller is requested to specify the number of attempts, the timing interval of the attempts, and a start time to begin the attempts. A final message confirms the caller's request. A billing record is generated and the calling party is charged for the service regardless of whether the call is completed. The interface 260 will continue to make attempts to complete the call until completion or expiration of the specified time intervals.

If the called party does not answer after expiration of the time interval, the calling party is called for notification that the called party was not available. The interface 260 will query the calling party to repeat the service at the same additional charge as the initial service. If accepted, the VMS generates a new billing record and continues to place the call.

If the called party answers, the interface 260 places a call to the calling party. If the calling party is available, the calls are connected. If the calling party is not available, the called party is informed and no more attempts are made to establish the call. The interface 260 will continue to try to reach the calling party until the time limit expires. If the calling party is reached, a message is played announcing that the call was completed and at what time, but the calling party was unavailable.

If the caller selects automatic message delivery, the interface 260 prompts the caller to select a message delivery provider (MDP). The caller chooses a MDP via the DTMF touch-tone pad of the calling station. A billing record is generated allowing a local exchange carrier to bill the MDP for access charges and the caller is connected to the appropriate MDP. Called number, calling number, billing number, billing message identifier, and originating trunk number are passed to the MDP.

The caller can be connected to a live operator at any time during the prompting by pressing "O". A "0—" call will be initiated to the TOPS and all collected data is forwarded to the operator handling the call via the database 308 interface monitor 307. All prompts and pre-recorded messages can be customized.

It should be appreciated by those skilled in the art that the specific embodiments disclosed above may be readily utilized as a basis for modifying or designed other structures for carrying out the same purposes of the present invention. It should also be realized by those skilled in the art that such equivalent constructions do not depart from the spirit and scope of the invention as set forth in the appended claims.

What is claimed is:

1. In a telephone network having a calling station connectable to a first switch means and a called station connectable to a second switch means, with the first and second switch means being connectable by a first link for call completion, with at least said second switch means also connectable by a data link to means for furnishing information necessary for call completion, the improvement comprising:

means connectable in said first link for storing call setup signals passing between said first switch means and said second switch means;

means connectable in said data link for storing call data;

means connectable in said first link to monitor for entry of a predetermined service access code by a user of the calling station or a user of the called station after call completion between the calling station and the called station and before either of said users goes on-hook; and control means connected to said monitor and responsive to entry of the predetermined access code for controlling offer and acceptance of one or more predetermined services, said stored data from said data link being used to determine information necessary for call completion, wherein call completion is then controlled and paid for by the user requesting the service.

2. In the telephone network as described in claim 1 wherein said second switch is a telephone operator position system.

3. The apparatus of claim 2 further comprising means for modifying a call-type field of a call set-up and for generating a signal to a switch which causes said switch to transfer said call directly to an operator station with associated call data.

4. The apparatus of claim 2 further comprising:

means for monitoring said monitor means for instructions from a caller indicating the caller's request for live operator assistance from an operator station; signalling means for signalling a switch to transfer call and call history data to a live operator; and means for transferring said call history data from a data base to a screen of said operator station.

5. In the telephone network as described in claim 1 wherein the service is call conferencing.

6. In the telephone network as described in claim 1 wherein the service is call recording.

7. In the telephone network as described in claim 1 wherein the service is silent call recording.

8. In the telephone network as described in claim 1 wherein the service is automatic call back.

9. In the telephone network as described in claim 1 wherein the service is automatic message delivery.

10. In the telephone network as described in claim 1 wherein said information necessary for call completion is validated billing information.

11. Apparatus for use in a telephone network having a calling station connectable to a first switch means and a called station connectable to a second switch means, with the first and second switch means being connectable by a first link for call completion, with at least said second switch means also connectable by a data link to means for furnishing information necessary for call completion, comprising:

means connectable in said data link for storing call data;

means connectable in said first link for forwarding said call setup signals to said second switch means;

means connectable in the link to monitor for entry of a predetermined service access code by a user of the calling station or a user of the called station after call completion between the calling station and the called station and before either of said users goes on-hook; and speech means responsive to entry of the predetermined service access code for issuing a predetermined prompt to at least one of the user of the calling station and the user of the called station; and control means connected to the monitor means and responsive to entry of predetermined signaling by one of the users following the issuance of the prompt for providing a predetermined service, said stored data from said data link being used to determine information necessary for call completion, wherein call completion is then controlled and paid for by the user requesting the predetermined service.

12. Apparatus for use in a telephone network having a calling station connectable to a first switch means and a called station connectable to a second switch means, with the first and second switch means being connectable by a first link for call completion, with at least said second switch means also connectable by a data link to means for furnishing information necessary for call completion, comprising:

means connectable in said first link for storing call setup signals passing between said first switch means and said second switch means;

means connectable in said data link for storing call data;

means connectable in said first link to monitor for entry of a predetermined service access code by a user of the calling station or a user of the called station after call completion between the calling station and the called station and before either of said users goes on-hook; and control means connected to the monitoring means and responsive to entry of predetermined signaling by one of the users for providing a predetermined service, said stored data from said data link being used to determine information necessary for call completion, wherein call completion is then controlled and paid for by the user requesting the predetermined service.

13. Apparatus for use in a telephone network having a calling station connectable to a first switch means and a called station connectable to a second switch means, with the first and second switch means being connectable by a first link for call completion, with at least said second switch means also connectable by a data link to means for furnishing information necessary for call completion, comprising:

means in the first switch means for storing call setup signals passing between said first switch means and said second switch means;

means in said data link for storing call data;

means in the first switch means to monitor for entry of a predetermined service access code by a user of the calling station or a user of the called station after call completion between the calling station and the called station and before either of said users goes on-hook; and control means connected to the monitor means and responsive to entry of predetermined signaling by one of the users for providing a predetermined service, said stored data from said data link being used to determine information necessary for call completion, wherein call completion is then controlled and paid for by the user requesting the predetermined service.

14. Apparatus for providing telephone user ancillary call services, the apparatus connectable in a first link for call completion between an origination switch and a destination switch, the switches connectable respectively to a calling and a called station, with at least said destination switch also connectable by a data link to means for furnishing information necessary for call completion, the apparatus comprising:

means connectable in said first link for storing at least one call setup signal passing from said origination switch to said destination switch;

means connectable in said data link for storing at least one call data signal;

means for monitoring for user entry of a predetermined service access code from at least one of said stations to request at least one ancillary call service; and means responsive to entry of said predetermined service access code and said at least one call setup signal for providing said at least one ancillary call service, after said stored data from said data link is used to determine information necessary for call completion.

15. The apparatus of claim 14 wherein said at least one call data signal comprises billing information.

16. The apparatus of claim 14 further comprising:
means for prompting a user of at least one of said stations to initiate said at least one ancillary call service.

17. The apparatus of claim 14 wherein said monitoring means monitors for said code entry after call completion between said calling and said called stations and before either of said stations goes on hook.

18. The apparatus of claim 14 wherein said monitoring means monitors for said code entry during call setup.

19. Apparatus for use in a telephone network having a calling station connectable to a first switch means and a called station connectable to a second switch means, with the first and second switch means being connectable by at least one link for call completion, with at least said second switch means also connectable by a data link to means for furnishing information necessary for call completion, comprising:

storage means connectable in said at least one link for storing call setup signals passing from said first switch means to said second switch means; means connectable in said data link for storing call data signals; monitor means connectable in said at least one link for monitoring for entry of a predetermined service access code;

means connectable in said at least one link responsive to said call setup signals and said predetermined service access code for forwarding said call setup signals on an alternative one of said at least one link to said second switch, said stored data from said data link being used to determine information necessary to route the call to said alternative one of said at least one link.

20. The apparatus of claim 19 further comprising:
means for prompting a user of at least one of said stations to enter a predetermined service access code.

* * * * *